(12) United States Patent
Hu et al.

(10) Patent No.: US 9,344,515 B2
(45) Date of Patent: May 17, 2016

(54) SOCIAL-DRIVEN PRECACHING OF ACCESSIBLE OBJECTS

(71) Applicant: Cisco Technology, Inc., San Jose, CA (US)

(72) Inventors: Hao Hu, San Jose, CA (US); Jiang Zhu, Sunnyvale, CA (US); Kevin Lee, Milpitas, CA (US); Flavio Bonomi, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 212 days.

(21) Appl. No.: 14/102,014

(22) Filed: Dec. 10, 2013

(65) Prior Publication Data

US 2015/0163320 A1 Jun. 11, 2015

(51) Int. Cl.
*H04L 29/08* (2006.01)
*H04L 12/747* (2013.01)
*G06F 17/30* (2006.01)
*G06Q 50/00* (2012.01)
*G06Q 10/10* (2012.01)

(52) U.S. Cl.
CPC ...... *H04L 67/2852* (2013.01); *G06F 17/30902* (2013.01); *G06Q 10/101* (2013.01); *G06Q 50/01* (2013.01)

(58) Field of Classification Search
CPC ............ G06Q 50/01; H04N 21/23106; H04N 21/4622; H04N 21/466; H04M 1/72572; H04Q 2011/0084
See application file for complete search history.

(56) References Cited

U.S. PATENT DOCUMENTS 7,441,045 B2 * 10/2008 Skene ............... G06F 9/505
709/201
7,769,641 B2 8/2010 Jouret et al.
(Continued)

FOREIGN PATENT DOCUMENTS

WO 2013059864 A1 5/2013

OTHER PUBLICATIONS

Prefetching in Content Distribution Networks via Web Communities Identification and Outsourcing Antonis Sidiropoulos et al. No. 30, 2005.*
(Continued)

*Primary Examiner* — Sargon Nano
(74) *Attorney, Agent, or Firm* — Johnson, Marcou & Isaacs, LLC

(57) ABSTRACT

A precaching system identifies an object, such as a media file, that a user accesses and then analyzes a social graph of the user to identify social graph contacts that may be interested in the object. Based on the content of the object—and the interests and connections of contacts in the social graph—the precaching system determines whether a particular contact in the user's social graph is likely also to access the object. For example, the precaching system may determine a hit score corresponding to the object and a likelihood that the particular contact in the social graph will access the object. If the precaching system determines that the likelihood that the particular contact will access the object meets or exceeds a threshold probability level for precaching the object, the precaching system precaches the object near the contact in anticipation that the contact will access the object.

20 Claims, 5 Drawing Sheets

(56) References Cited

U.S. PATENT DOCUMENTS

| | | | | |
|---|---|---|---|---|
| 8,090,863 | B2* | 1/2012 | Raciborski | G06F 17/30194 709/231 |
| 8,180,720 | B1* | 5/2012 | Kovacs | H04L 67/2842 706/47 |
| 8,219,645 | B2* | 7/2012 | Harvell | G06F 17/30902 709/214 |
| 8,255,557 | B2* | 8/2012 | Raciborski | G06F 17/30194 709/219 |
| 8,370,449 | B2* | 2/2013 | Harvell | G06F 17/30902 709/214 |
| 8,370,452 | B2* | 2/2013 | Harvell | G06F 15/167 709/203 |
| 8,375,097 | B2 | 2/2013 | Lawler et al. | |
| 8,463,876 | B2* | 6/2013 | Raciborski | G06F 17/30194 709/219 |
| 8,489,731 | B2* | 7/2013 | Gagliardi | H04L 43/045 709/219 |
| 8,566,884 | B2 | 10/2013 | Toebes et al. | |
| 8,682,995 | B1 | 3/2014 | Lawler et al. | |
| 8,875,254 | B2* | 10/2014 | Deshpande | H04W 12/06 709/204 |
| 8,886,769 | B2* | 11/2014 | Thibeault | H04L 67/2847 709/219 |
| 8,914,367 | B2 | 12/2014 | Toebes et al. | |
| 8,914,814 | B1* | 12/2014 | Middleton | G06F 9/541 718/104 |
| 9,037,700 | B2* | 5/2015 | Agrawal | G06Q 50/01 709/203 |
| 2003/0187984 | A1* | 10/2003 | Banavar | H04L 29/06 709/225 |
| 2005/0278443 | A1* | 12/2005 | Winner | G06Q 30/02 709/224 |
| 2006/0277308 | A1* | 12/2006 | Morse | G06F 17/30867 709/227 |
| 2008/0045172 | A1* | 2/2008 | Narayanaswami | G06Q 30/02 455/187.1 |
| 2010/0262683 | A1* | 10/2010 | Gerber | H04L 67/2852 709/223 |
| 2014/0019552 | A1* | 1/2014 | Oh | H04L 12/1818 709/204 |
| 2014/0032698 | A1 | 1/2014 | Hsu et al. | |
| 2014/0074923 | A1* | 3/2014 | Vasudevan | G06F 21/10 709/204 |
| 2014/0074927 | A1* | 3/2014 | Rodriguez | G06Q 50/01 709/204 |
| 2014/0089378 | A1* | 3/2014 | Forrest | H04L 67/1097 709/202 |
| 2014/0282636 | A1* | 9/2014 | Petander | H04N 21/4663 725/1 |

OTHER PUBLICATIONS

Boldrini, et al., "ContentPlace: Socialaware Data Dissemination in Opportunistic Networks", Proceedings of the 11th international symposium on Modeling, analysis and simulation of wireless and mobile systems (MSWiM '08), Oct. 27, 2013, 203-210.

Hackelbusch, "International Search Report and Written Opinion issued in International Application No. PCT/US2014/068232,", Feb. 16, 2015, 1-86.

Hampton, et al., "Social Networking Sites and Our Lives", Pew Research Center, Jun. 16, 2011, 1-85.

Han, et al., "SocialCDN: Caching techniques for distributed social networks", Peer-to-Peer Computing (P2P), 2012 IEEE 12th International Conference on Sep. 3-5, 2012, pp. 191-202, Sep. 3, 2012, 1-2.

Klein, et al., "A socially aware caching mechanism for encounter networks", Published online: Mar. 24, 2011, Telecommunication Systems Dec. 2012, vol. 51, issue 4, pp. 297-304, Mar. 24, 2011, 1-8.

Sidiropoulos, et al., "Prefetching in Content Distribution Networks via Web Communities Identification and Outsourcing", World Wide Web; Internet and Web Information Systems, Kluwer Academic Publishers, DO, vol. 11, No. 1, Aug. 15, 2007, 39-70.

Teng, "Integrating Web Caching and Web Prefetching in Client-Side Proxies", IEEE Computer Society, IEEE Transactions on Parallel and Distributed Systems, vol. 16, No. 5, May 1, 2005, 444-455.

* cited by examiner

SOCIAL-DRIVEN PRECACHING OF ACCESSIBLE OBJECTS

TECHNICAL FIELD

The present disclosure relates generally to precaching accessible objects, and more particularly to precaching accessible objects at locations determined based on social graph connections of a user.

BACKGROUND

As social media has become more popular, Internet traffic associated with sharing social media has increased. For example, individual users rely on the Internet to share content, such as texts, pictures, audios, and videos with their contacts. Social network websites have also emerged as a popular medium for sharing such content and allowing users to stay connected to each other.

In addition to individual users, business enterprises are increasingly interested in the ability to share social media and have thus developed collaborative environments and platforms deployable over multiple locations. For example, multiple users from different geographic locations can rely on collaborative platforms to attend the same virtual meeting or view the same video.

As the need for sharing of social media grows, so too does the need for efficiently managing the way in which social media is shared among multiple users and business enterprises.

DETAILED DESCRIPTION OF THE EXAMPLE EMBODIMENTS

Overview

Figure 1:
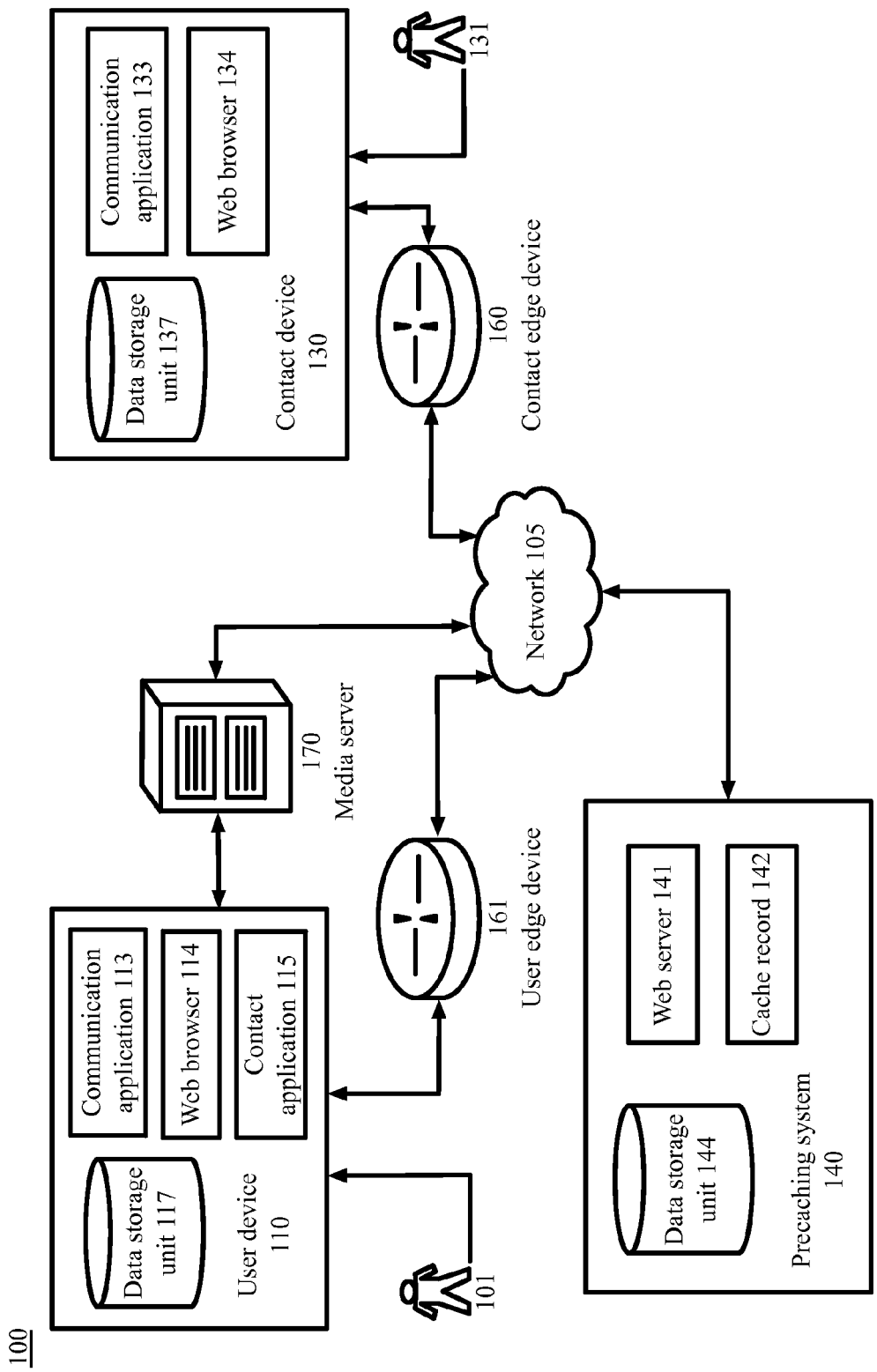
FIG. 1 is a block diagram depicting a system for precaching objects based on social graph connections and object content, in accordance with certain example embodiments.

A method, comprises determining a threshold level for precaching accessible objects, wherein the threshold level corresponds to a likelihood that one or more contacts in a user's social graph will access an object. A particular object associated with a user computing device of the user is identified, wherein the user computing computer device has accessed the particular object. A content associated with the particular object is determined. A geographic location of a computing device of a social graph contact of the user is determined. A probability that the computing device of the contact will access the particular object is determined. In response to determining that a probability that the computing device of the contact will access the particular object meets or exceeds the threshold level for precaching accessible objects, a precaching location to cache the particular object is identified, wherein the precaching location is near the geographic location of the computing device of the contact. The particular object is precached at the determined precaching location.

Description

Although precaching social media allows users quicker access to content, precaching is limited by the effort and expense associated with storing large media files, as well as the challenges associated with determining where the content should be precached. Managing social media through precaching thus only makes sense, for example, when the media is likely to be accessed again in the near future and when it is possible to intelligently determine when and where the media should be precached.

As disclosed herein, a precaching system identifies an object, such as a video, audio, or other media file, that a user accesses. The precaching system then analyzes the social graph of the user to identify social graph connections (or "contacts") of the user that may be interested in the object. Based on the content of the object—and, for example, the interests of contacts in the social graph of the user—the precaching system determines whether the particular contacts in the user's social graph are likely to also access the object. If the precaching system determines that a contact is likely to access the object, the precaching system precaches the object near the contact in anticipation that the contact will access the object.

More particularly, in certain examples, a precaching system determines a threshold probability level for precaching objects near a contact of the user. The threshold probability level, for example, reflects the likelihood that contacts in a given social graph will access a given object. An operator of the precaching system may, in certain examples, configure the threshold probability level to be higher or lower, depending on the level of precaching that the operator desires to undertake. For example, by providing a high probability threshold level—that is, by requiring a greater probability that users and their contacts will access objects before the objects are precached—the operator may decrease the number of objects that are ultimately precached as described herein. Conversely, by providing a lower probability threshold level—and hence requiring a lower probability that users and their contacts will access objects before the objects are precached—the operator can increase the level of object precaching.

After determining a threshold probability level for precaching objects near a contact of the user, the precaching system identifies—for a particular user—accessible objects associated with a user. For example, when a particular user accesses an object, such as when viewing a video from a social network website or in the user's email, the precaching system determines that the user has accessed the object. The precaching system then determines content information associated with the accessible object. For example, the precaching system may rely on the metadata associated with the object to determine the name of the object or other information regarding the object's content, such as the subject matter category of the object. In certain examples, the precaching system then stores information for the identified object in a record associated with the particular user, such as on an edge router or other storage device near the particular user's network.

Once the precaching system identifies an object associated with a particular user, the precaching system determines social graph contacts of the particular user. The social graph contacts of the user may include friends, family, associates, address-book contacts, and/or others that make up the complete social network of the particular user, along with the relatedness of the members of the social network to the particular user. A contact that the user emails every day, for example, may be a closely related contact of the user's social graph, whereas a contact that the particular user only occasionally follows on a micro-blogging service may be more distantly related to the user in the user's social graph.

Based on the social graph contacts of the user—and the content information of the accessible object—the precaching system determines geographic locations to precache the object. For example, the precaching system determines the likelihood that a particular contact in the user's social graph will access the particular object. The likelihood of a particular contact accessing the object may be based on several factors. A contact in the user's social graph that frequently downloads music videos, for example, may be more likely to access an object that is determined to be a music video. Additionally or alternatively, a contact that is more closely related to the user in the user's social graph may be more likely to access the object than a contact that is more distantly related. In certain examples, the likelihood that a particular social graph contact of the user will access the object may be determined, at least in part, based on a hit score associated with the particular object. Alternatively, such as when a user does not have many social contacts, the precaching system may determine the threshold probability level based on hit scores—for a particular object—across several users.

After determining the probability that a particular contact in the user's social graph will access the object, in certain examples, the precaching system compares the determined probability for the contact with the threshold level of probability. If the determined probability for the contact to access the object does not meet or exceed the threshold level of probability for accessing objects, the precaching system determines that the object should not be precached near the contact. Alternatively, if the determined probability for the contact to access the object meets or exceeds the threshold level of probability for accessing objects, the precaching system determines that the object should be precached geographically near the contact's access point(s). The precaching system thus determines the location of the access points near the contact, and—based on the location of the access points—determines the geographic location for precaching the object.

In certain examples, such as when a contact relies on multiple access points to access objects, the precaching system may determine a preferred access point for a contact. The precaching system then determines the location for precaching the object based on the contact's preferred access point. For example, if a contact with multiple access points—such as a home access point and a work access point—most frequently accesses shared music videos at home, the precaching system may determine that a music video should be precached geographically near the contact's home access point. The system may not know which locations are the user's "home" or "work" locations, and references to those locations may be merely for convenience. The system can determine that the user has multiple access points that are used regularly and a preferred access point for precaching particular content.

Once the precaching system determines a geographic location for precaching the object, the precaching system precaches the accessible object at the determined geographic location. For example, if the access point for a contact is in a particular city—and the precaching system identifies a server or other data storage unit near the contact's access point in the city—the precaching system precaches the object to the server or other data storage unit. In certain example embodiments, the precaching system may communicate an instruction to the current storage location of the object to transmit the object to the identified precaching location for storage near the contact. The contact then accesses the object via the contact's access point (and hence the server or data storage unit associated with the access point).

In certain examples, the precaching system may rely on the determined probabilities associated with accessing one or more objects—and the storage space available to precache the object at a particular location—to determine whether to precache the one or more objects. That is, in certain examples the precaching system may not rely on the determined threshold level when determining whether to precache an object, but rather the probability associated with an object and the available precaching space to precache the object. The system also may rely on a combination of these factors together with the threshold level. For example, the precaching system may precache multiple objects based on how likely one or more contacts are to access the objects. The precaching system may then precache the highest ranked (most-likely-to-be-accessed) objects according to available space. If only 1.0 gigabyte of space is available at a particular location, the precaching system may precache the highest-ranking objects at the location until the 1.0-gigabyte of space is full. At which point, the precaching system will cease precaching objects at the location. Hence, lower ranking objects will not be precached at the particular location.

In certain examples, the precaching system may rely on the methods and systems described herein to precache objects for multiple contacts in one or more social graphs. For example, the precaching system may cache an object near an access point of a contact in the user's social graph, such as in the city where the contact resides. Separately, the precaching system may precache the same object near another contact's access point in the same city. If the precaching system then determines that the same object is cached at two locations in the same city, the precaching system may revise the precaching architecture so that the object is precached only in the county encompassing the city (or other location that is accessible locally by both contacts). That is, rather than precaching the object twice in the same geographic region, for example, the precaching system may determine a precaching architecture where the object is precached only once for the region.

In certain examples, the precaching system may—for multiple objects and multiple contacts—geographically precache the objects based on a ranking of the objects' probability for being accessed and/or storage available storage capacity. For example, the precaching system may initially precache objects in a particular city at location A and location B until the storage capacities at location A and location B are saturated. Once the storage capacity is saturated, for example, the precaching system may then collectively rank the objects at location A and B. Based on the collective ranking of the objects, the precaching system may redistribute the objects to maximize storage capacity at location A and location B. Additionally or alternatively, the precaching system may precache one of the previously stored objects at a different location, such as at a storage location that serves both locations A and B.

By using and relying on the methods and systems described herein, the precaching system can predict whether a contact in a user's social graph is likely to request an object—before the object is actually requested—based on the social graph of the user who shares the object and the behaviors of the contacts in the user's social graph. Relying on this prediction, the precaching system can strategically and intelligently precache an object near a contact and hence decrease the latency period associated with accessing an object (should the contact decide to access the object). Accordingly, the methods and systems described herein increase the online experience for contacts accessing the object. And, by precaching an object near a contact that is likely to access the object, the methods and systems described herein decrease bandwidth consumption across the network, while reducing objects that are needlessly precached in multiple locations. Further, by consolidating the precaching of objects for multiple contacts, for example, the precaching system can reduce storage space associated with the object without noticeably impacting the latency associated with accessing the objects.

Example System Architectures

Turning now to the drawings, in which like numerals indicate like (but not necessarily identical) elements throughout the figures, example embodiments are described in detail.

FIG. 1 is a block diagram depicting a system 100 a system for precaching objects based on social graph connections and object content, in accordance with certain example embodiments.

As depicted in FIG. 1, the example operating environment 100 includes a user network computing device 110, a contact network computing device 130, a precaching computing system 140, a contact edge device 160, a user edge device 161, and a media server 170 that communicate with each other via one or more networks 105. In certain example embodiments, two or more of these systems (including systems 110, 130, 140, 160, 161, and 170) or parts thereof may be integrated into the same system. In certain example embodiments, a user 101 and/or a contact 131 associated with a user device 110 or a contact device 130, respectively, must install an application and/or make a feature selection on the user device 110 or the contact device 130 to obtain the benefits of the methods and techniques described herein.

Each network 105 includes a wired or wireless telecommunication means by which network computing devices (including devices 110, 130, 140, 160, 161, and 170) can exchange data. For example, each network 105 can include a local area network ("LAN"), a wide area network ("WAN"), an intranet, an Internet, a storage area network (SAN), a personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages or objects. Throughout the discussion of example embodiments, it should be understood that the terms "data" and "information" are used interchangeably herein to refer to text, images, audio, video, or any other form of information that can exist in a computer-based environment.

Each network computing device 110, 130, 140, 160, 161, and 170 includes a communication module capable of transmitting and receiving data over the network 105. For example, each network device 110, 130, 140, 160, and 170 can include additional system components, such as a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, 140, 160, 161, and 170 are operated by end-users or consumers or precaching system operators.

The user 101 can employ a communication application 113, such as a web browser application 114 or a stand-alone application, to view, download, upload, or otherwise access objects or web pages via a distributed network 105. The communication application 113 of the user computing device 110 can interact with web servers or other computing devices connected to the network 105. For example, the communication application 113 can interact with the user network computing device 110, the precaching system 140, and a media server 170. In certain example embodiments, the communication application 113 may also interact with a user edge device 161 located geographically near the user device 110. The communication application 113 may also interact with a web browser 114, which provides a user interface, for example, for accessing other devices associated with the network 105. For example, the user 101 may employ the web browser 114 of the user device 110 to access objects associated with the media server 170, such as when downloading a shared video or audio file from the media server 170. In certain example embodiments, the user device 110 may include hardware and software for capturing, using, and processing digital objects, such as a video camera and associated software to take, process, and share videos, photographs, or other digital objects.

In certain example embodiments, the user computing device 110 may also be equipped with and/or associated with hardware and software for determining the geographic location of the user device 110 and/or the location of network access points of the user device 110. For example, the user computing device 110 may include a location application (not shown), which relies on WiFi signals and cellular communication towers to determine the location of the user device 110 (or network access points that the user device 110 accesses or has access to). Additionally or alternatively, the location application may rely on satellites, Global Positioning System ("GPS"), Differential Global Positioning System ("DGPS"), a Network Location Provider ("NLP"), or other location identifying technology of the user device 110 to determine location information for the user device 110. In certain example embodiments, the location application can interact with other applications on the user device 110, such as the communication application 113 or the contact application 115 on the user device 110. In certain example embodiments, the location application (not shown) may also be configured to communicate and interact with a location-based service provider that, in conjunction with the user device 110, facilitates determination of the location of the user device 110 and/or the location of network accesses points of the user device 110. For example, the location application may, along with a location-based service, rely on WiFi signals and cellular communication towers to determine the location of the user device 110 and the location of network access points of the user device 110 for the network 105.

The user device 110 may also include one or more contact applications 115. A contact application 115 may be any program or application on the user device 110 or accessible by the user device 110 that maintains a list of contacts of the user 101 that other systems can access, such as the precaching system 140. Examples of contact applications 115 might include email applications, text applications, instant messaging applications or lists, calendar invite lists, or contact databases that include or identify social graph contacts 131 of the user 101. The contacts from a contact application 115 may be prioritized by factors such as frequency of communication with user 101, the number of contact applications on which a particular contact appears, or any other prioritizing factors which may be extracted from the applications.

The user computing device 110 may further include a data storage unit 117. The example data storage unit 117 can include one or more tangible computer-readable storage devices. The data storage unit 117 can be a component of the user device 110 or be logically coupled to the user device 110. For example, the data storage unit 117 can include on-board flash memory and/or one or more removable memory cards or removable flash memory. In certain example embodiments, the data storage unit 117 may store objects, such as photographs, video files, audio files or other such digital media-type files and data. Additionally or alternatively, the data storage unit 117 may store metadata associated with such objects, such as the name of the media, the file type, and/or a content description of the media.

The contact computing device 130 represents a device associated with a social graph contact 131 of a user 101. The social graph contact 131 can employ a communication application 133, such as a web browser application 134 or a stand-alone application, to view, download, upload, or otherwise access objects or web pages via a distributed network 105. The communication application 133 of the contact device 130 can interact with web servers or other computing devices connected to the network 105. For example, the communication application 133 can interact with the contact computing device 130, the precaching system 140, the user device 110, and the media server 170 via the network 105.

The communication application 133 may also interact with a contact edge device 160 associated with the network 105 that is geographically near the contact device 130 as described herein. The communication application 133 may also interact with a web browser 134, which provides an interface, for example, for the contact 131 to access other devices or systems associated with the network 105. For example, the contact 131 may employ the web browser 134 of the contact computing device 130 to access objects stored on the contact edge device 160, such as when downloading a shared video or audio file. In certain example embodiments, the contact device 130 may include hardware and software for capturing, using, and processing objects, such as a video camera and associated software to take, process, and share videos, photographs, or other digital objects.

In certain example embodiments, the contact computing device 130 may also be equipped with and/or associated with hardware and software for determining the geographic location of the contact computing device 130 and/or the location of network access points of the contact computing device 130. For example, the contact computing device 130 may include a location application (not shown), which relies on WiFi signals and cellular communication towers to determine the location of the contact computing device 130 (or network access points that the user device 110 accesses or has access to). Additionally or alternatively, the location application may rely on satellites, Global Positioning System ("GPS"), Differential Global Positioning System ("DGPS"), a Network Location Provider ("NLP"), or other location identifying technology of the contact computing device 130 to determine location information for the contact computing device 130. In certain example embodiments, the location application can interact with other applications on the contact computing device 130, such as the communication application 133. In certain example embodiments, the location application (not shown) of the contact computing device 130 may also be configured to communicate and interact with a location-based service provider that, in conjunction with the contact computing device 130, facilitates determination of the location of the user device 110 and/or the location of network accesses points of the user device 110. For example, the location application may, along with a location-based service, rely on WiFi signals and cellular communication towers to determine the location of the contact computing device 130 and the location of network access points of the contact computing device 130 for the network 105.

The contact computing device 130 may further include a data storage unit 137. The example data storage unit 137 can include one or more tangible computer-readable storage devices. The data storage unit 137 can be a component of the contact computing device 130 or be logically coupled to the contact computing device 130. For example, the data storage unit 137 can include on-board flash memory and/or one or more removable memory cards or removable flash memory. In certain example embodiments, the data storage unit 137 may store objects, such as photographs, video files, audio files or other such digital media-type files and data. Additionally or alternatively, the data storage unit 137 may store metadata associated with such objects, such as the name of the media, the file type, and/or a content description of the media.

The precaching system 140 represents a system that, among other things, determines whether an accessible object should be precached to a particular location for a social graph contact 131 of the user 101. As such, the precaching system 140 is configured to communicate with the user device 110, the contact device 130, the contact edge device 160, the user edge device 161, and/or the media server 170 via the network 105. The precaching system 140 can include a web server 141, which may represent the computer-implemented system that the precaching system 140 employs, for example, to identify objects that the user 101 access via the user device 110, identity social graph contacts 131 of the user 101, determine the likelihood that the identified contacts 131 will access the object, determine a location to precache the object, and then to precache the object at the determined geographic location. In certain example embodiments, the precaching system 140 may include a cache record 142, which may include information regarding previously cached objects, such as the geographic location where the object was previously cached. The cache record 142 may also include, for one or more particular cached objects, information regarding the frequency at which users 101 and contacts 131 of a user access a particular object. In certain example embodiments, the user edge device 161 may be the system responsible for storing the cache record 142.

In certain example embodiments, the precaching system 140 may operate as a location-based service that, in conjunction with a location application (not shown) of the user device 110, determines the location of the user device 110 and/or network access points of the user device 110. Likewise, the precaching system 140 may operate as a location-based service that, in conjunction with a location application (not shown) of the contact computing device 130, determines the location of the contact computing device 130 and/or network access points of the contact computing device 130. Additionally or alternatively, the precaching system 140 may receive location information and/or network access point information from a separate location based server and/or from application operating and executing on the user device 110 and/or the contact device 130.

The precaching system 140 may also include an accessible data storage unit 144. The example data storage unit 144 can include one or more tangible computer-readable media. The data storage unit 144 can be stored on the precaching system 140 or can be logically coupled to the precaching system 140. For example, the data storage unit 144 can include on-board flash memory and/or one or more removable memory cards or removable flash memory.

In certain example embodiments, the precaching system 140 may precache objects on a contact edge device 160. The contact edge device 160 represents any device near a contact 131, for example, where an object may be cached. For example, the edge device 160 (and, similarly, the edge device 161) may include routers, routing switches, integrated access devices (IADs), multiplexers, and a variety of metropolitan area network (MAN) and wide area network access devices that have storage capacity, including those devices that are geographically near and associated with a contact 131 and/or a user 101. In certain example embodiments, the contact edge device 160 may be a server located near the contact 131.

In certain example embodiments, the precaching functions of the precaching system 140 may operate and execute completely on the user device 110 and/or the contact computing device 130, such as within, or as a companion application to, an application on the user device 110 and/or the contact computing device 130. Additionally or alternatively, the precaching functions of the precaching system 140 may execute and operate, in whole or in part, on the user edge device 161 and/or the contact edge device 160, for example. Alternatively, the precaching functions of the precaching system 140 may operate and execute separately and independently from the user device 110, contact edge device 160, the user edge device 161, and/or the contact computing device 130. For example, the precaching system 140 may operate and execute within a separate computing system or other computing system that precaches accessible objects as described herein. Alternatively, the precaching functions of the precaching system 140 may execute partially on the user device 110, on the contact computing device 130, the user device 110, contact edge device 160, and/or partially on a separate computing system.

It will be appreciated that the network connections shown are example and other means of establishing a communications link between the computers and devices can be used. Additionally, those having ordinary skill in the art and having the benefit of the present disclosure will appreciate that the user device 110, contact device 130, precaching system 140, contact edge device 160, user edge device 161, and media server of FIG. 1 can have any of several other suitable computer system configurations. For example, a user computing device 110 embodied as a mobile phone or handheld computer may not include all the components described above.

Example Processes

The components of the example operating environment 100 are described further hereinafter with reference to the example methods illustrated in FIGS. 2-4.

Figure 2:
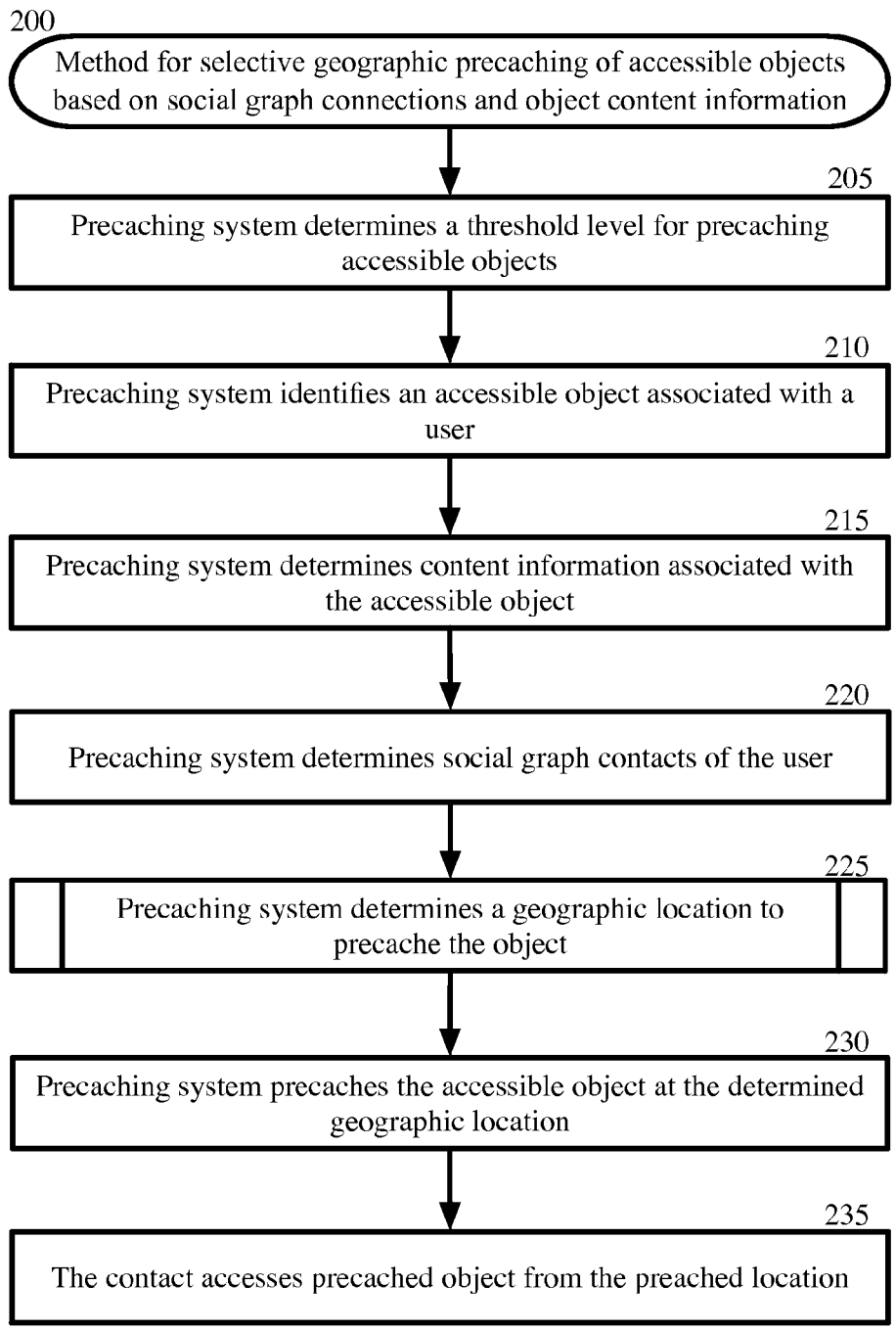
FIG. 2 is a block flow diagram depicting a method for selective geographic precaching of accessible objects based on social graph connections and object content information, in accordance with certain example embodiments.

FIG. 2 is a block flow diagram depicting a method 200 for selective geographic precaching of accessible objects based on social graph connections and object content information, in accordance with certain example embodiments.

With reference to FIGS. 1 and 2, in block 205, in certain example embodiments the precaching system 140 determines a threshold level, such as a threshold probability level, for precaching accessible objects. That is, the precaching system 140 determines a baseline probability level for which contacts 131 in a social graph will want to access an object. The threshold level then serves as a basis for determining whether particular contacts 131 will want to access the object and hence whether such objects should be precached near the contacts 130 as described herein. The threshold level for precaching accessible objects, for example, can be any number or value that the precaching system 140 determines. For example, the value may be a number, such as 1.0—at or above which a particular contact 131 is likely to access an object and below which the particular contact 131 is not likely to access the object.

In certain example embodiments, an operator (not shown) of the precaching system 140 may configure the threshold level to be higher or lower, depending on the level of precaching that the operator desires to undertake. That is, by providing a high probability threshold level—such as by requiring a greater likelihood that users and their contacts will access objects before the objects are precached—the operator may decrease the number of objects that are ultimately precached as described herein. For example, if an operator configures a probability to be 1.0 instead of 0.5, then the higher threshold level will result in fewer objects being precached. Conversely, by providing a lower probability threshold level—and hence requiring a lower probability that users will access objects before the objects are precached—the operator can increase the level of object precaching. For example, if an operator configures a probability to be 0.5 instead of 1.0, then the lower threshold level will result in a greater number of objects being precached.

In certain example embodiments, an operator (not shown) of the precaching system 140 may configure the threshold level for a particular object and/or the object's content. That is, the operator may configure the threshold level based on the popularity of the object and/or the popularity of the object's content. If the object (or its content) is very popular across multiple users 101, for example, then the threshold for precaching the object among one or more contacts 131 in a user's social graph may be lower. That is—based on the object's high popularity (or the high popularity of the object's content)—others are more likely to access the object. For example, if an original music video has been shared over and over again amongst multiple users 101 and has unexpected, widespread appeal (that is, the video has "gone viral"), the operator may determine that the threshold level for precaching the music video should be lower. Likewise, the operator may determine that a similar, second version of the music video should also have a lower threshold level for precaching, based on the content relationship to the original video.

Additionally or alternatively, in certain example embodiments, an operator may configure the threshold level to be based, in whole or in part, on the social graph contacts 131 of a specific user 101. That is, the threshold level may be specific for a particular user's social graph and hence correspond to the probability that one or more particular contacts 131 in the user's social graph may access the object. For example, based on identified social graph contacts (as described in block 220) and based on hit scores for an object as described in block 305, the precaching system 140 may determine—for five social graph contacts 131 of the user—a probability of 10, 20, 25, 40, and 50, respectively, with the higher number indicating a greater likelihood of accessing a particular object. The operator may then configure the precaching system 140 to then select a threshold level of 20, for example. As such, and as described in further detail in block 305, only those contacts above the threshold of 20 (that is, those having the values of 25, 40, and 50) would be determined to exceed the threshold. In this way, in certain example embodiments the threshold level may be determined for a particular social graph of a user 101 and then used as a basis for precaching determinations for other contacts 131 in the social graph of the user 101. In other words, in such example embodiments, the threshold level may be used as a basis for making relative comparisons and predictions among contacts 131 in a social graph of a user 101.

In block 210, the precaching system 140 identifies an accessible object associated with a user 101. For example, when a particular user accesses an object, such as when viewing a video from a social network website, the precaching system determines that the user has accessed the object. As used herein, the "object" can be any type of digital media that a user 101 or their social graph contacts may access and share via the network 105. For example, the "object" may include any type of media that is in an electronic or digital format, such as any item that is presented in an audio (sound) or video (visual) form that can be seen and heard by a user 101 or the social graph contacts 131 of the user 101. Example "objects" include music files (such as MP3, Midi, or WMA files); video feeds found on the Internet at popular video websites, including those posted on social network websites or file sharing websites in various file formats (such as .MOV, XVID, and MP4 files); and animated or graphic design files and images used to create interactive websites and games. Further, the object may be provided or shared in any way over the network 105, such as through social networking websites, electronic mail, and/or text messaging.

In certain example embodiments, the object contains and/or is associated with metadata regarding the object, such as descriptive metadata. For example, the metadata may include information regarding how the object was created, the purpose of the object, the time and date of creation of the object, the file type of the object, the creator and/or author of the object, the location origin of the object, and content information regarding the object. The content information, for example, may include words, phrases, or other items, such as meta tags, keywords and/or phrases, that describe the object. For example, the metadata of a video or audio file may be its subject matter category, such as entertainment or educational. Additionally or alternatively, the metadata may include more specific information about the category, such as the type of music (classical, rock, folk, for example), the type of entertainment (comedy, drama, or horror, for example), or other subcategory of content information.

To determine whether an object is associated with a user 101, the precaching system 140 determines whether the user 101 has accessed the object. That is, the precaching system 140 determines, for example, whether the user 101 has clicked, tapped, or otherwise selected the object—or a link to the object—so that the user 101 can receive the object. For example, a web browser 114 on the user device 110 may keep a record of accessed objects, such as from cookies associated with the object from a website history associated with the web browser 114. The precaching system 140 then determines from the cookies and/or the browsing history that the user 101 has accessed an object. In certain example embodiments, the user 101 may receive the object in an electronic message, such as an email or text message. For example, the user 101 may select a preference associated with the email and/or text messaging applications to allow the precaching system 140 to determine the content of user-received objects. Hence, the precaching system 140 may determine that an object is associated with the user 101 by scanning the user's email and/or text messaging application for accessed objects.

In certain example embodiments, the precaching system 140 determines the location where the user 101 accessed the object. For example, the precaching system 140 may identify the media server 170 from which the user 101 accessed a media object. Alternatively, the precaching system 140 may identify a user edge device 161 where the user 101 accessed the object. To determine such locations, the precaching system 140 may, for example, rely on metadata associated with the accessed object, wireless access points associated with the user device 110 of the user 101, and/or location-based information associated with the user device 110.

In block 215, after the precaching system 140 identifies an object associated with the user 101, the precaching system 140 determines the content information associated with the accessible object. For example, the precaching system 140 may read the metadata of the object to determine the subject matter of the object, such as the category of the object and/or the subcategory of the object. The web server 141 of the precaching system 140, for example, may determine that the object is a music file for a specific genre of music. In certain example embodiments, object content determination may occur on devices or systems associated with the precaching system 140, such as a media server 170 from which the object was accessed. In certain example embodiments, an edge device 160 near the user 101, for example, may inspect the accessed object to determine the object's content. The precaching system 140 then receives the content information for the object, such as via the network 105.

In block 220, the precaching system 140 determines social graph contacts of the user 101. That is, the precaching system 140 determines other individuals that have or share a relationship with the user 101 based on the user's activities across the network 105. For example, the social graph contacts 131 of a user 101 refers to all of a user's contacts, friends, family, and other members of a user's online network. The social graph not only represents the contacts 131 of a user's social network, but also how the contacts 131 are related and how closely the contacts are related. The social graph can be compiled from the social networks of which the user 101 is a member, email contacts, text messaging contacts, address book contacts, frequent transaction parties associated with the user 101, and other suitable sources.

To determine a social graph contact 131, for example, the precaching system 140 may search the identities of the user's contacts, friends, business associates, family members, or any other identity that can be extracted from the publically available social network content of the user 101. In certain example embodiments, a social network website (not shown) may provide the precaching system 140 a list of contacts from the user's online social community, from which the precaching system 140 may extract contact 131 identities. The social network website may further provide to the precaching system 140 data concerning the relative strength of the connection between the contacts 131 and the user 101, as well as among the contacts 131. The strength of the connection may be determined by factors that may apply to the structure of each particular social network system. For example, a social network system may categorize members of the community as "friends," "friends of friends," or as first, second, or third-degree contacts.

The precaching system 140 may additionally or alternatively extract contact 131 identities from a contact application 115 on the user device 110. A contact application 115 may be any program or application on the user device 110 or accessible by the user device 110 that maintains a list of contacts of the user 101 from which the precaching system 140 may extract data. Examples of contact applications 116 might include, but not be limited to, email applications, text applications, instant messaging, calendar invite lists, or contact databases. The strength of a connection for such contacts 131 may be determined, for example, on factors such as frequency of communication with user 101, the number of different contact applications 115 on which a particular contact 131 appears, or any other prioritizing factors which may be extracted from the user device 110.

In block 225, the precaching system 140 determines a geographic location to precache the object. For example, the precaching system 140 determines the likelihood that one or more particular contacts in the user's social graph will access the object that the user also accessed. The precaching system 140 then compares that likelihood with the determined threshold probability level for accessing a given object. If, for example, the likelihood that one or more particular contacts in the user's social graph will access the object meets or exceeds the threshold probability level, then the precaching system 140 determines locations to precache the object based on the contact's network access points. Example details of block 225 are described hereinafter with reference to FIG. 3.

Figure 3:
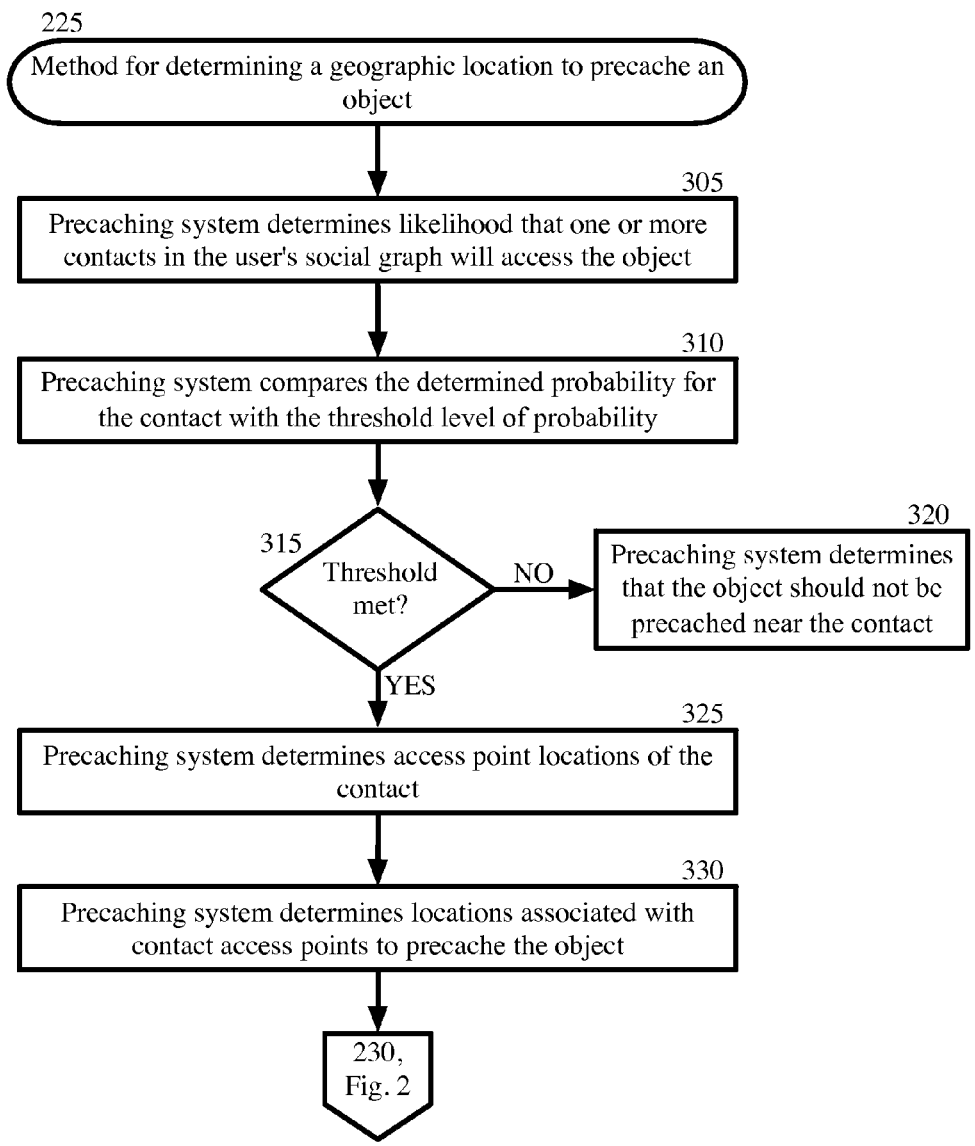
FIG. 3 is a block flow diagram depicting a method for determining a geographic location to precache an object, in accordance with certain example embodiments.

FIG. 3 is a block flow diagram depicting a method for determining a geographic location to precache an object, in accordance with certain example embodiments.

With reference to FIGS. 1 and 2, in block 305, the precaching system 140 determines the likelihood that one or more particular contacts 131 in the user's social graph will access the object. That is—based on an object the user 101 has accessed—the precaching system 140 correlates the content of the user-accessed object with the interests and/or relationship of the social graph contacts 131 of the user 101, thus allowing the precaching system 140 to determine the likelihood a contact will also access the object.

The likelihood of a contact 131 accessing an object may be based on several factors. A contact in the user's social graph that frequently downloads music videos, for example, may be more likely to access an object that—based on the determined content information of the object—is a music video. Additionally or alternatively, a contact 131 that is more closely related to the user 101 in the user's social graph may be more likely to access the object than a contact 131 that is more distantly related. For example, a contact 131 of the user 101 that both likes music and is a first degree contact 131 or close friend of the user 101 may be much more likely to download a music video that the user 101 posts on a social networking website than is a contact 131 that is more distant from the user 101 in the social graph and/or that does not typically download music videos. Based on such factors, the precaching system 140 determines a value, for example, that represents the probability that the contact 131 will access the object. The value can be any number, for example, that reflects how likely the contact 131 is to access the object verses a given contact.

In certain example embodiments, the probability determination for a particular contact 131 of the user 101 is configurable. That is, an operator of the precaching system 140 may configure the precaching system 140 to weigh various factors, such as those factors described above, in determining the likelihood that the particular contact 131 will access the particular object. For example, the operator may configure the precaching system 140 to provide more weight for a contact 131 that is closer to the user 101 in the user's social graph than a contact 131 this is further from the user 101 in the user's social graph. Likewise, if a particular contact 131 is more interested in comedies—and the object content pertains to a comedic film clip—then the operator may configure the precaching system 140 to weight the contact 131 more heavily than a different contact 131 that is more interested in dramas (or not interested in comedies).

In certain example embodiments, the precaching system 140 may determine the likelihood that one or more particular contacts 131 in the user's social graph will access the object based on a hit score associated the particular object. For example, the hit score is updated whenever the user 101 clicks, taps, or otherwise selects an accessible object so as to access the object. As such, the hit score relates to how likely others—such as social graph contacts 131 of the user 101—are to access the object. In certain example embodiments, the hit score includes a timestamp "t" of the latest update. To reflect the time fading factor, an example implementation is to update the hit score by the following formula:

$r+r^{(c-t)}*hit(t)$, where $0<r<1$, "c" is the current timestamp, and hit(t) is the previous hit score at time "t."

Initially, hit(0)=r. In this example, the choice of time granularity is a day for simplicity, although this choice can be flexible and configurable. Additionally, the reason for "r" to be bounded by 0 and 1 is to age the popularity of the content as time progresses. As the popularity of a content decreases, the hit score of the content should logically decrease. Other techniques, such Kernel Density Estimation (KDE) or other non-parametric methods, can also be used to determine the hit score, in accordance with certain example embodiments.

In certain example embodiments, once the per user, per metadata content is gathered as described herein, the precaching system 140 can use the information to determine whether the same or similar content should be cached near a particular contact 131, such as at a contact edge router 160 the is located geographically near the contact 131 as described herein. Upon extracting the content information about an accessed object, such as from the metadata associated with the object, the precaching system 140 can aggregate all the hit scores of the same metadata information of contacts 131 of the user 101 who shares the content. Hence, the aggregated hit score provides insight to how popular the content of the object is amongst the user's social graph contacts 131. Further, a user 101 who is popular, for example, will more likely have their content precached than another user 101 who is not as popular. A user's popularity depends on the number of contact the user 101 has, for example. The cacheability of an object, however, also depends on whether user's social graph contact 131 also likes the content of the object. In certain example embodiments, such information is embedded in the hit score for each contact 131 in the social network of the user 101. Alternatively, such as when a user 101 does not have many social contacts, the precaching system 140 may determine the probability level based on hit scores—for a particular object—across several users 101.

In certain example embodiments, depending on the hit score (hit) and content size (s) of the object, the precaching system 140 may maximize the hit score subject to that the sum of all the contents is subject to the storage capacity of the edge router, such as the storage capacity of a contact edge device 160. For example, where hit_i denotes the hit score of the $i^{th}$ object, the precaching system 140 may determine the subset $T \subseteq \{1,2,\ldots,n\}$ that maximizes $\sum_{i \in T} hit\_i$ subject to $\sum_{i \in T} s\_i \le S$, where S is the storage capacity of the edge router.

In block 310, after determining the probability that a particular contact 131 in the user's social graph will access the object, in certain example embodiments the precaching system 140 compares the determined probability for the particular contact 131 with the determined threshold level of probability. That is, the precaching system 140 determines whether the probability (likelihood) that the particular contact 131 will access the object meets or exceeds the threshold level of probability that a given contact will access a given object. For example, if the threshold level is 1.0, and the determined probability for the particular contact 131 is 2.0, the precaching system 140 will compare the 1.0 value with the 2.0 value.

In certain example embodiments, the comparison may be a relative comparison among multiple contacts 131, such as when the precaching system 140 relies on the likelihood of a particular contact 131 accessing an object as the threshold level. For example, if five social graph contacts 131 have a probability of 10, 20, 25, 40, and 50 of accessing the object—with the higher number indicating a greater likelihood of accessing the object—and the threshold level is 20, then the precaching system 140 will compare the 20 value with the 10, 20, 25, 40, and 50 values. In certain example embodiments, which are discussed in further detail below, the precaching system 140 may not rely on a comparison to a determined threshold level, but rather a ranking of the probabilities associated with accessing one or more objects and the available storage space at one or more locations for precaching the objects.

If the precaching system 140 determines—based on the comparison of the determined probability for the particular contact 131 with the determined threshold level of probability—that the determined probability meets or exceeds the threshold level for precaching the object, the method follows the "YES" branch of block 315 to block 325 of FIG. 3. But if the precaching system 140 determines that the threshold level is not met, then the method follows the "NO" branch of block 315 to block 320 of FIG. 3.

In block 320, in response to determining that the threshold level for accessing the object is not met, the precaching system 140 determines that the object should not be precached near the contact. That is, because the threshold level is not being met, the likelihood of the particular contact 131 accessing the object is low and hence does not warrant precaching the object near the particular contact 131. The precaching system 140 thus does not precache the object near the near the particular contact 131.

In block 325, in response to determining that the threshold level is met (or exceeded), the precaching system 140 determines access point locations of the contact 131. That is, the precaching system 140 identifies locations where the particular contact regularly or routinely accesses the network 105 with the contact device 130, such as at a home location, a work location, or other location around where the contact 131 works and lives. The contact device 130 may access the network 105, for example, via a local area network ("LAN"), a wide area network ("WAN"), storage area network (SAN), a personal area network (PAN), a metropolitan area network (MAN), a wireless local area network (WLAN), a virtual private network (VPN), a cellular or other mobile communication network, Bluetooth, near field communication (NFC).

As one skilled in the art will appreciate, a variety of methods are available for determining network access points of a device such as the contact device 130. For example, the precaching system 140 may monitor Wi-Fi systems available to the contact device 130 of the contact 131. That is, the contact device 130 may be configured to scan, at regular intervals, Wi-Fi signals that are available to the contact device 130. The precaching system 140 then receives the Wi-Fi scan results from the contact device 110, and then determines the location of the access points available to the contact device 130 based on the received Wi-Fi scans. Additionally or alternatively, the precaching system 140 may receive an Internet Protocol address (IP address) associated with the contact device 130 when the contact device 130 connects to various networks. Additionally or alternatively, the precaching system 140 may determine or receive location information for the contact device 130, such as from a location-based service, and hence determine available access point locations of the contact device 130 based on the geographic locations of the contact device 130.

In certain example embodiments, such as when a contact 131 relies on multiple access points to access objects with the contact device 130, the precaching system 140 may determine a ranked order of access points. For example, the precaching system 140 may determine that the contact device 130 of the contact 131 most frequently accesses the network 105 at home, followed by the contact's work location and then a coffee shop near the contact's home. Additionally or alternatively, the precaching system 140 may correlate object content with the access point locations of the contact device 130. For example, the precaching system 140 may rely on the metadata associated with an object to determine the object's content as described herein. Based on the access point locations of the contact device 130, the precaching system 140 can then determine what content the contact accesses at different access point locations. For example, the precaching system 140 may determine that the contact 131 most frequently accesses music videos via a home access point of the contact 131, whereas the contact 131 most frequently accesses work-related training videos at the contact's work-based access point.

In block 330, the precaching system 140 determines locations associated with the identified access points of the contact device 130 to precache the object. That is, based on the identified access points for the contact device 130, the precaching system 140 determines one or more geographic locations to precache the object near one or more of the access points (and hence near where the contact device 130 accesses the network). For example, if the contact 131—via the contact device 130—typically accesses objects via a home network as determined in block 325, then the precaching system 140 may determine a location near the contact's home access point to precache the object, such as on a contact edge router 160 or other device geographically near the contact's home access point. Additionally or alternatively, if the precaching system 140 determines that the contact 131 typically accesses training videos at work, the precaching system 140 may determine that—for a training video object—the object should be precached near the work access point of the contact 131. For example, the precaching system 140 may determine that the work training video should be precached on a contact edge router 160 near the contact's work location and/or a local server at the contact's work location. In certain example embodiments, the precaching location may be within a controlled enterprise/campus network, such as on a branch of an enterprise network. In certain example embodiments, the precaching location determination may be a more general case, where external architecture, such as edge contact devices 160, exists (or can be deployed) for object precaching.

As used herein, "near" the contact device 130 or the access point refers to a configurable distance from the contact device 130 or the network access point, such as a radius around the contact device 130 and/or around one or more determined access points of the contact device 130. For example, a location near the contact device 130 or the access point may be at the same location as the contact device 130 (or the access point) or within meters of the contact device 130 (or the access point). In certain example embodiments, the distance from the contact device 130 or the access point may be in kilometers, such as about 1, 2, 3, 4, 5, 6, 7, 8, 9, 10, 15, 20, 25, 30, 40, 50, 100, 200, 300, 400, 500, 700, or 1,000 kilometers from the contact device 130 or the access point.

Additionally or alternatively, "near" the contact device may be determined based on the number of network hops or "hop counts" to reach the contact device 130. That is, a path from the precaching location to the contact device 130 may be "nearer" to the contact device if there are fewer devices, such as routers, through which the transmission of information, such as transmission of the object, must occur. For example, if an object is originally cached at a location that would require 15 hops to reach the contact device 130—and the precaching system 140 precaches the object at a location that only require 10 hops—the precaching location would be near to the contact device 130 (and hence near to the contact 131).

In certain example embodiments, identifying a location to precache the object near the contact device 130 and/or around one or more determined access points of the contact device 130 includes identifying a location to precache the object that is geographically closer to the contact device 130 (or the access point) than was original location from which the user 101 accessed the object. That is, if the user 101 accessed an object from a user edge device 161, for example, a location near the contact device 130 or access point may include a contact edge device 160 that is geographically closer to the contact device 130 than is the user contact device 161. For example, if the user device 110 accesses an object from an edge user device 161 near the user 101 in California—and the precaching system 140 determines access points of the contact device 130 located in New York—locations near the contact device 130 or the access point may include any locations east of California that would place the object closer to the contact device 130 or access points, such as in New York or states bordering New York. In certain example embodiments, the precaching system 140 may determine that a device, such as a contact edge device 160, may need to be deployed near the contact device 130 or access points so that the object can be precached (and accessed) near the contact device 130 or the access points.

Returning to FIG. 2, in block 230 of FIG. 2, the precaching system 140 precaches the accessible object at the determined geographic location. That is, the precaching system 140 stores the object at the one or more determined locations associated with the identified access points of the contact device 130. For example, the precaching system precaches 140 may retrieve the object from the user edge device 161 via the network 105 and then transmit the object to the determined precaching location—such as to an identified contact edge device 160—via the network 105. The contact edge device 160 can then store (precache) the object so that the contact device 130 can access the object from the contact edge device 160. That is, if the contact 131 decides to access the object, the contact 131 can use the contact device 130 to access the object from the contact edge device 160 on which the object is stored.

In block 235, the contact 131 accesses the precached object from the precached location. That is, the contact 131 can use the contact device 130 to access the object from the location where the precaching system 140 precached the object. For example, if the precaching system 140 precaches the accessible object on a contact edge device 160 near a determined home access point of the contact 131, then the contact 131 can use the contact device 130 to access the object contact edge device 160. More particularly, if the user 101 initially accessed the object from a media server 170 in California, for example—but the precaching system 140 precaches the object on a contact edge device 160 near the user's home access point in New York city—the contact 131 can access the object from the contact edge device 160 in New York. By accessing the object from the contact edge device 160 in New York in this example—instead of from the media server 170 located in California—the precaching system 140 decreases the latency associated the contact 131 accessing the object.

In certain example embodiments, the precaching system 140 may rely on the methods and systems described herein to manage and precache objects for multiple contacts 131 in one or more social graphs. The precaching system 140 manages objects in a hierarchical and centralized way, for example, thus allowing the precaching system 140 to manage and precache objects globally for a group of contacts instead of just locally. The precaching system 140 can globally manage the objects, for example, in association with network devices, such as user edge devices 161 and/or contact edge devices 160, without having to store objects on user devices. Example details of such global management are described hereinafter with reference to FIG. 4.

Figure 4:
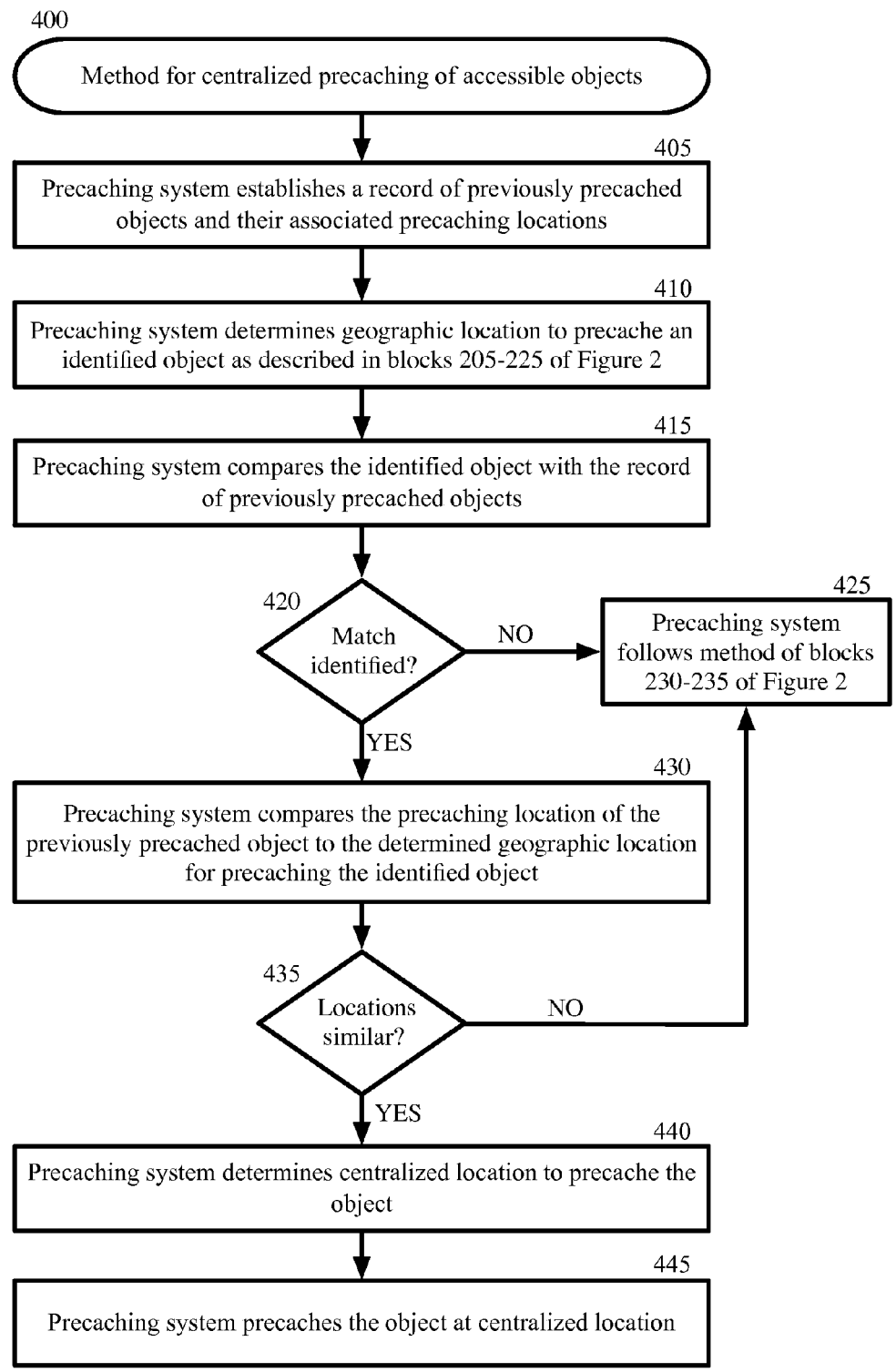
FIG. 4 is a block flow diagram depicting a method for centralized precaching of accessible objects, in accordance with certain example embodiments.

FIG. 4 is a block flow diagram depicting a method for centralized precaching of accessible objects, in accordance with certain example embodiments.

In block 405, the precaching system 140 establishes a record of previously precached objects and their associated precaching locations. That is, in certain example embodiments the precaching system 140 maintains an accessible record of objects that the precaching system 140 has precached, such as in a cache record 142 of precached objects. For example, the precaching system 140 may associate with the cache record 142 the previously precached object's metadata (including any metadata tags), the object's content, the location where the object was previously precached, the time the object was precached, the hit score (or other determined probability used to determine contacts 131 that are likely to access the object), along with any other information regarding the object. The precaching system 140 stores the record, for example, in the data storage unit 144 of the precaching system 140 and/or on user edge storage devices 160 and/or contact edge storage devices 160. The precaching system 140 can then access the cache record 142 as needed.

In block 410, the precaching system 140 determines a geographic location to precache an identified object as described in blocks 205-225 of FIG. 2. For example, the precaching system 140 identifies an accessible object that is associated with a user 101 and then determines contact's 131 in the social graph of the user 101 that are likely to access the object. Then, based on determined access points of the contact 131, the precaching determines a geographic location near the contact 131 to precache the identified object as described herein. For example, the precaching system 140 may identify a contact edge device 160 near the contact 131 to precache the object. The location of the contact edge device 160 then serves as the identified location, for example, for precaching the object.

In block 415, the precaching system 140 compares the identified object with the record of previously precached objects. That is, the precaching system 140 determines whether the identified object matches a record for a previously precached object associated with the cache record 142. For example, the precaching system 140 may compare the metadata tag of the identified object with the stored metadata tags of other objects previously associated with the cache record 142. By comparing the identified object with the record of previously precached objects, the precaching system 140 attempts to locate a match for the object in the cache record 142 of previously precached objects.

If the precaching system 140 identifies a match for the identified object in the cache record 142 of previously precached objects, the method follows the "YES" branch of block 420 to block 430 of FIG. 4. If, however, the precaching system 140 does not identify a match for the identified object in the cache record 142 of previously precached objects, the method follows the "NO" branch of block 420 to block 425 of FIG. 4.

In block 425, if the precaching system 140 determines that the identified object does not match an object in the cache record 142 of previously precached objects, the method follows blocks 230-235 of FIG. 2. That is, the precaching system 140 precaches the accessible object at the determined geographic location, such as on a contact edge device 160 near the one or more access points of the social graph contact 131 of the user 101. The social graph contact 131 can then access the identified object from the precached location, such as from the contact edge device 160 near the one or more access points of the contact 131 (and hence near the contact 131 of the user 101).

In block 430, if the precaching system 140 identifies a match for the identified object in the cache record 142 of previously precached objects, the precaching system 140 compares the precaching location of the previously precached object to the identified location for precaching the identified object. That is, based on the matching record for the identified object in the cache record 142 of previously precached objects, the precaching system 140 determines whether the identified object is the same object as an object that has previously been precached. The precaching system 140 then compares the location where the object was previously precached to the identified location for precaching the identified object. For example, the object may have previously precached on a particular contact edge device 160 in Jersey City, N.J. If, when processing the identified object as described in block 410, the precaching system 140 determines that the identified object should be precached in lower Manhattan, N.Y. (the identified location in this example), the precaching system 140 compares the Jersey City location to the identified lower Manhattan, N.Y. location to determine if the locations are similar.

Two or more locations may be similar, for example, if they are in the same city, same county, same state, are same geographic region of the country, such as in the Pacific Northwest. In certain example embodiments, the locations may be similar if the precaching system 140 determines that the locations are within a configurable radius, such as a radius of about 1, 2, 3, 4, 5, 6, 7, 8, 9, 10, 15, 20, 25, 30, 40, 50, 100, 200, 300, 400, 500, 700, or 1,000 kilometers. In certain example embodiments, two or more locations may be similar if they are closer to each other than they are to the original access point of one or more users 101 that accessed the object. For example, if users 101 originally access the object in Europe—and the precaching system 140 later precaches the object in New York—a second identified location for the object in Florida may be similar to the New York, as both locations are in the United States (and closer to the contacts 131 than the European access point).

In certain example embodiments, the extent to which locations are similar may be configurable based on the level of multi-contact precaching an operator (not shown) of the precaching system 140 desires. For example, the more precaching that is desired, the nearer to each other two locations must be. That is, configuring locations to be within 5 kilometers of each other to be similar—rather than 100 kilometers—will result in fewer objects being centrally precached (and hence more overall precaching of objects at non-centralized locations). Conversely, configuring the similarity to be 100 kilometers—instead of 5 kilometers—may result in a single location precache of an object serving the 100-kilometer radius (and hence less overall objects being precached).

If the precaching system 140 determines that the locations are similar, the method follows the "YES" branch of block 435 to block 440 of FIG. 4. If, however, the precaching system 140 determines that the locations are not similar, the method follows the "NO" branch of block 435 to block 425. That is, if the precaching system 140 determines that the locations are not similar, the precaching system 140 precaches the identified object at the determined geographic location. Hence, the same object may be precached at two or more locations. For example, the precaching system 140 may have previously precached the object at one location. But because the precaching system 140 determines that a different contact 131 at a different location may likely to access the object, the precaching system 140 precaches the same object at the different location. That is, the precaching system 140 precaches the object at a second geographic location that is different from the first (previous) precaching location.

In block 440, the precaching system 140 determines a centralized location to precache the object. That is, if the precaching system 140 determines that the object was previously precached at a location that is similar to the identified location in block 410, the precaching system 140 determines a location to precache the object so that all contacts 131 at the precaching location are able to quickly access the object. As such, the precaching system 140 determines a centralized location to precache the object that is near both the original (first) precaching location and the identified location determined in block 410 for the identified object.

For example, the centralized location may be between the original (first) precaching location and the identified location. Alternatively, the centralized location may be within a certain distance of the original (first) precaching location and the identified location, such as within a configurable radius that encompasses both the original (first) precaching location and the identified location. For example, the radius may be 1, 2, 3, 4, 5, 6, 7, 8, 9, 10, 15, 20, 25, 30, 40, 50, 100, 200, 300, 400, 500, 700, or 1,000 kilometers from the original (first) location, the identified location, or the location of the centralized location. In certain example embodiments, various factors may influence the choice of the centralized location, such as resource constraints at determined locations or other device capabilities at the determined locations. For example, a shortage of storage space in one location may indicate to an operator of the precaching system 140 that another location should be used as the centralized location. Additionally or alternatively, the centralized location may be a location that decreases the number of network hops for transmitted information to reach the contact device 130.

As an example embodiment, if the precaching system 140 originally (first) precached an object on a particular contact edge device 160 in Jersey City, N.J.—and the precaching system 140 then determines that an identified location for precaching the identified object is lower Manhattan, N.Y.—the precaching system 140 may determine a different contact edge router 160 to precache the object that is located between Jersey City and lower Manhattan. Alternatively, the precaching system 140 may determine that the original precaching location (Jersey City, N.J.) should serve as the centralized precaching location for the object for both the Jersey City, N.J. and lower Manhattan areas. Alternatively, the precaching system 140 may determine that lower Manhattan should serve as the centralized precaching location for the Jersey City, N.J. and lower Manhattan areas. In other words, the precaching system 140 may determine that the centralized location should be the same as the original (first) location, the same as the identified location, or a location that is distinct from the original (first) location and identified location.

In block 445, the precaching system 140 precaches the object at the determined centralized location. That is, the precaching system 140 stores the object at the one or more determined centralized locations. For example, the precaching system 140 may retrieve the object from a user edge device 161 or from the cache record 142 of precached objects via the network 105. The precaching system 140 then transmits the object to the determined centralized precaching location—such as to an identified contact edge device 160—via the network 105. The centralized, contact edge device 160 can then store (precache) the object so that contact devices 130 of multiple contacts can access the object from the contact edge device 160.

As an example embodiment, after a user 101 accesses an object, the precaching system may precache the object at a first geographic location as described herein, such as location X, where two contacts 131—contacts A and B—can access the object. The precaching system 140 may then determine that—for contacts C and D in the user's social graph—the object should be precached at location Y. If the precaching system 140 determines that location X and location Y are similar, then the precaching system 140 may determine a centralized location to precache the object so that each contact (contact A, B, C, and D) can each more quickly access the object, as compared to accessing the object from the user's access point for the object. For example, the precaching system 140 may precache the object at location X, location Y, or a different centralized location Z.

In certain example embodiments, the precaching system 140 may repeat the methods described in blocks 405-445 multiple times for the same object. As such, the geographic area served by a contact edge device 160, for example, may broader area and hence a larger group of contacts. For example, the precaching system may first cache an object at location X to serve to contacts A and B in the same city. As the object becomes more popular, for example, the precaching system may identify additional contacts—in various user social graphs—that are likely to access the object. Hence, the precaching system 140 may determine a centralized location Y to precache the object so that contacts A, B, and C, and D can access the object. As the object becomes more popular, such as if the object goes viral, the precaching system 140 may then precache the object in a centralized location that servers thousands of contacts 131. The precaching system 140 may also precache the object at multiple, centralized locations.

In certain example embodiments, the precaching system 140 may rely on the determined probabilities for accessing one or more objects—and the storage space available to precache the object at a determined precaching location—to determine whether (and where) to precache the one or more objects. That is, in addition to or alternatively to relying on the threshold level comparison to determine whether to precache an object as described in blocks 305-310, the precaching system 140 may rely on both the probability for accessing the objects and the space available to precache the objects.

For example, the precaching system 140 may determine, for one or more objects, how likely the objects are to be accessed as described in block 305. If, for example, the precaching system 140 determines for an object a probability of 5, 20, 35, 40, and 50, respectively—for five contacts accessing the object—the precaching system 140 may determine an average (mean) probability of 30 for the contacts to access the object. In other embodiments, the precaching system 140 may rely on the median or mode when determining the likelihood that multiple contacts, for example, will access a particular object. The precaching system 140 may then determine an initial location for precaching each of the multiple objects as described in blocks 325-330.

For multiple objects to be precached at the same location, such as on the same contact edge device 160, the precaching system 140 then precaches the multiple objects at the location—based on their probability of being accessed—until the storage capacity at the location is saturated. For example, the precaching system 140 may determine—for five objects—probabilities of 15, 20, 30, 35, 40, and 50 for accessing the objects, with the higher value representing a greater likelihood of that contacts will access the object. If the available storage space on the contact edge device 160 is 1.0 gigabyte—and the two highest-ranking objects (40 and 50 probabilities) are collectively about 1.0 gigabyte—the precaching system 140 will precache only the two highest raking objects on the contact edge device 160. And, in such example embodiments, the precaching system 140 may precache the highest-ranking objects without regard to whether the objects meet or exceed the threshold level determined in block 205. In certain example embodiments, the precaching system 140 may precache the remaining, lower-ranking objects (such as the 15, 20, 30, and 35 probabilities) on one or more of contact edge devices 160, for example, at other locations.

In certain example embodiments, the precaching system 140 may consolidate objects at one or more locations in a geographic region based on an aggregated ranking of the objects and/or available storage space. For example, the precaching system 140 may initially precache 10 objects in a particular city at location A and an additional 10 objects at location B in the same city. Then, based on the methods and systems described herein, the precaching system 140 may identify additional objects, such as five additional objects, to precache in the same city. By collectively ranking the 25 objects according to the probabilities for accessing each object, for example, the precaching system 140 may redistribute the objects among the locations A and B to maximize the number of objects associated with the city. For example, the precaching system 140 may—based on the size of each of the 25 objects in this example—redistribute the objects such that 12 objects are stored on contact edge device 160 at location A while the 13 remaining objects are stored on contact edge device 160 at location B. In other example embodiments, such as when storage space is limited at locations A and B, the precaching system may precache only the top 20 of the 25 ranked objects between locations A and B. For example, the precaching system 140 may store 8 objects at location A and 12 objects at location B, while not precaching the lowest five ranking objects.

Additionally or alternatively, the precaching system 140 may determine additional storage space is needed to maximize the storage efficiency and accessibility of the objects. For example, the precaching system 140 may, as described herein, centrally precache one or more of the 25 objects from the above example at a centralized location C that serves both the city and the areas covered by locations A and B. That is, the precaching system 140 may store 8 objects at location A, 12 objects at location B, and the three remaining objects at location C. Alternatively, the precaching system 140 may redistribute the 25 objects among locations A, B, and C in any other way that maximizes the number of accessible objects for the city while also best utilizing the available storage space in the city. And as those skilled in the art will appreciate, such redistribution may occur on the city level, county level, state level, or other geographic regions. For example, a group of very popular objects may be stored on at a location that serves a large number of contacts as described herein.

In certain example embodiments, precaching an object at a central location may include precaching at various layers in a hierarchical infrastructure associated with the network 105. The precaching system 140 can then modify the precaching locations to accommodate resource constraints. For example, at Layer 1 in a hierarchical infrastructure, a first contact edge device 160 may serve contacts A and B, whereas a second contact edge device 160 in Layer 1 may serve contacts C and D. At a higher level (Level 0), a third contact edge device 160 centrally connects the first and second contact edge devices 160 of Layer 1. The contacts A, B, C, and D may or may not know each other, but are part of a social graph "G."

Based on the behaviors "B" of the contacts—such as publishing behavior, consuming behavior, and mobility behavior—the precaching system 140 generates a hit score for each contact, where $h\_i\hat{}j=H(G,B)$ for the content "j" of the object. Supposing a resource constraint "C" exists at each location (in this example, only storage is considered, that is j requires s_j disk space), the precaching system 140 solves the following problem, for example:

max \sum h_i^j
subject to \sum s_j<C
for all i,j under consideration

Mapping to Layer 1, for contacts A and B, the precaching system 140 caches the object contents at the first contact edge device 160 of Layer 1. For contacts C and D, the precaching system 140 caches the object contents at the second contact edge device 160 of Layer 1. At Layer 0, the storage may be carried out for all four contacts A, B, C, and D. For example, for any object contents that the precaching system 140 has not cached at Layer 1, such as because of resource constraints, the precaching system 140 may precache the object contents at Layer 0. That is, the precaching system 140 may precache the object contents on the third contact edge device 160 in Layer 0.

For example, Layer 1 may be a city and Layer 0 may be a county containing the city as described herein, with contacts A, B, C, and D residing in the city. Hence, the first and second contact edge devices 160, for example, may be near A and B as well as near C and D, respectively. Layer 0, for example, may include the third contact edge device 160 that—being in and/or serving a county—is not as near to A, B, C, or D as the first and second contact edge devices 160. Based on storage constraints, for example, the precaching system 140 may precache an object's contents at the city and/or county level for contacts A, B, C, and D. For example, the precaching system 140 may precache the object contents at the device in Layer 0 to serve contacts A, B, C, and D. In certain example embodiments, multiple, additional layers may exist, such as layers associated with a state, a region including all or parts of several states, or larger regions. Hence, the precaching system 140 not only manages object precaching locally, but can also manage object precaching globally.

Other Example Embodiments

Figure 5:
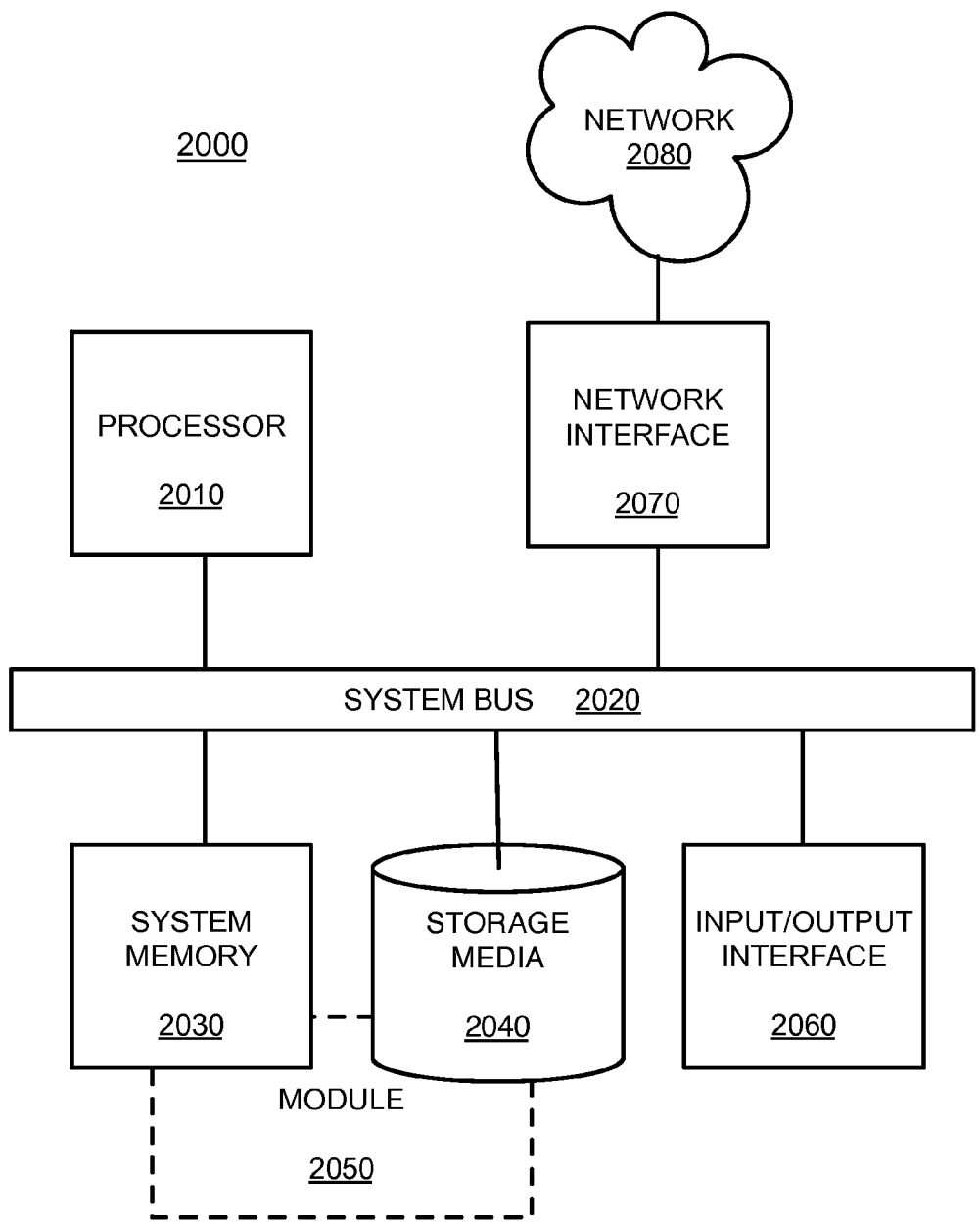
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010.

Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the examples described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method to precache objects, comprising:
   determining, by one or more computing devices, a threshold probability for precaching accessible objects, wherein the threshold probability corresponds to a likelihood that one or more contacts in a user's social graph will access an object;
   identifying, by one or more computing devices, a particular object associated with a user computing device of the user, wherein the user computing device has accessed the particular object;
   determining, by the one or more computing devices, a content associated with the particular object and one or more content categories associated with the determined content;
   determining, by the one or more computing devices, a geographic location of a computing device of a social graph contact of the user;
   determining, by the one or more computing devices, one or more interests of the social graph contact;
   determining, by the one or more computing devices and for the computing device of the social graph contact of the user, a probability that the computing device of the social graph contact will access the particular object, the probability determined based at least in part on:
      a correspondence of one or more particular determined interests of the social graph contact to one or more particular content categories of the object; and
      a strength of connection between the social graph contact and the user within the social graph;
   determining, by the one or more computing devices, that the probability that the computing device of the social graph contact will access the particular object meets or exceeds the threshold probability for precaching accessible objects;
   in response to determining that the probability that the computing device of the contact will access the particular object meets or exceeds the threshold probability:
      determining, by the one or more computing devices, one or more access point locations near the computing device of the social graph contact; and
      identifying, by the one or more computing devices, a precaching location to cache the particular object based on the determined one or more access point locations near the computing device of the social graph contact, wherein the precaching location is less than a predetermined distance from the geographic location of the computing device of the contact or wherein communication between the precaching location and the geographic location requires less than a predetermined number of intervening devices.

2. The method of claim 1, further comprising precaching, by the one or more computing devices, the particular object at the determined precaching location.

3. The method of claim 1, further comprising:
   determining, by the one or more computing devices, that the particular object has previously been precached at a first location near the computing device of the social graph contact;
   identifying, by the one or more computing devices, a centralized location to precache the particular object, wherein the centralized precaching location is located near both the first location and the identified precaching location to precache the particular object; and
   precaching, by the one or more computing devices, the particular object at the centralized location.

4. The method of claim 3, wherein the centralized location is the same location as either the first location or the identified precaching location to precache the particular object.

5. The method of claim 3, wherein the centralized location is different from both the first location and the identified precaching location to precache the particular object.

6. The method of claim 1, wherein the one or more access point locations near the computing device of the social graph contact comprise an access point that the computing device of the social graph contact has previously accessed.

7. The method of claim 1, wherein the probability that the computing device of the social graph contact will access the particular object is further based at least in part on a hit score associated with one or more users accessing the particular object.

8. The method of claim 7, wherein the hit score corresponds to a popularity of the object among multiple users, social graph contacts of the multiple users, or combinations thereof.

9. A computer program product, comprising:
   a tangible, non-transitory, computer-readable media having computer-executable program instructions embodied thereon that when executed by a computer cause the computer to precache objects, the computer-executable program instructions comprising:
      computer-executable program instructions to determine a threshold probability for precaching accessible objects, wherein the threshold probability corresponds to a likelihood that one or more contacts in a user's social graph will access an object;
      computer-executable program instructions to identify a particular object associated with a user computing device of the user;
      computer-executable program instructions to determine a content associated with the particular object and one or more content categories associated with the determined content;
      computer-executable program instructions to determine a geographic location of a computing device of a social graph contact of the user;
      computer-executable program instructions to determine one or more interests of the social graph contact;
      computer-executable program instructions to determine, for the computing device of the social graph contact of the user, a probability that the computing device of the social graph contact will access the particular object, the probability determined based at least in part on:
         a correspondence of one or more particular determined interests of the social graph contact corresponds to one or more particular content categories of the object; and a strength of connection between the social graph contact and the user within the social graph;

computer-executable program instructions to determine that the probability that the computing device of the social graph contact will access the particular object meets or exceeds the threshold probability for precaching accessible objects; and in response to determining that the probability that the computing device of the contact will access the particular object meets or exceeds the threshold probability:

computer-executable program instructions to determine one or more access point locations near the computing device of the social graph contact; and computer-executable program instructions to identify a precaching location to cache the particular object based on the determined one or more access point locations near the computing device of the social graph contact, wherein the precaching location is less a predetermined distance from the geographic location of the computing device of the contact or wherein communication between the precaching location and the geographic location requires less than a predetermined number of intervening devices.

10. The computer program product of claim 9, further comprising:

computer-executable program instructions to determine that the particular object has previously been precached at a first location;

computer-executable program instructions to determine a centralized location to precache the particular object, wherein the centralized precaching location is located near both the first location and an identified precaching location to precache the particular object; and computer-executable program instructions to precache the particular object at the centralized location.

11. The computer program product of claim 10, wherein the centralized location is either the same location as the first location, the same location as the identified precaching location to precache the particular object, or a location that is different from both the first location and the identified location to precache the particular object.

12. The computer program product of claim 9, wherein the probability that the computing device of the contact will access the particular object is determined based at least in part on the content of the object and a determined interest of the contact in the content of the object.

13. The computer program product of claim 9, wherein the probability that the computing device of the contact will access the particular object is based at least in part on a hit score associated with one or more users accessing the particular object, wherein the hit score corresponds to a popularity of the object among multiple users, social graph contacts of the multiple users, or combinations thereof.

14. The computer program product of claim 9, further comprising computer-executable program instructions to precache the particular object at the determined precaching location.

15. A system to precache objects, comprising:

a storage device; and a processor communicatively coupled to the storage device, wherein the processor executes application code instructions that are stored in the storage device to cause the system to:

identify a first object associated with a first user computing device of a first user;

identify a second object associated with a second user computing device of a second user;

determine a first content associated with the first object and one or more content categories associated with the determined first content;

determine a geographic location of a computing device of a first social graph contact of the first user;

determine one or more interests of the first social graph contact;

determine, for the computing device of the first social graph contact of the first user, a first probability that the computing device of the first social graph contact will access the first object, the first probability determined based at least in part on:

a correspondence of one or more particular determined interests of the first social graph contact to one or more particular content categories of the first object;

a strength of connection between the first social graph contact and the first user within the social graph;

determine, for a second object, a second probability that a second computing device will access the second object, wherein the second probability is based at least in part on a second content of the second object;

determine that the first probability for accessing the first object is greater than the second probability for accessing the second object; and, in response to determining that the first probability is greater than the second probability:

determine one or more access point locations near the computing device of the first social graph contact; and identify a first precaching location to cache the first object based on the determined one or more access point locations near the computing device of the first social graph contact, wherein the first precaching location is less than a predetermined distance from the geographic location of the computing device of the first contact or wherein communication between the first precaching location and the geographic location requires less than a predetermined number of intervening devices.

16. The system of claim 15, wherein the processor is further configured to execute computer-readable program instructions stored on the storage device to cause the system to precache the first object at the determined first precaching location.

17. The system of claim 16, wherein the processor is further configured to execute computer-readable program instructions stored on the storage device to cause the system to precache the second object at a second geographic location that is separate from the first geographic location.

18. The system of claim 17, wherein the first probability and the second probability are based at least in part on a hit score associated with one or more users accessing the first object or the second object, respectively.

19. The system of claim 16, wherein the processor is further configured to execute computer-readable program instructions stored on the storage device to cause the system to:

determine that the first object has previously been precached at a second location near the computing device of the first social graph contact;

identify a centralized location to precache the particular object, wherein the centralized precaching location is located near both the first location and the second location and precache the particular object at the centralized location.

20. The system of claim 15, wherein the second object is associated with a second user and the second computing device is a device of a contact in a social graph of the second user.

* * * * *